Nov. 27, 1951

J. G. BAKER 2,576,436

TELEPHOTO TYPE OBJECTIVE LENS

Filed Oct. 8, 1949

2 SHEETS—SHEET 1

Fig. 1.

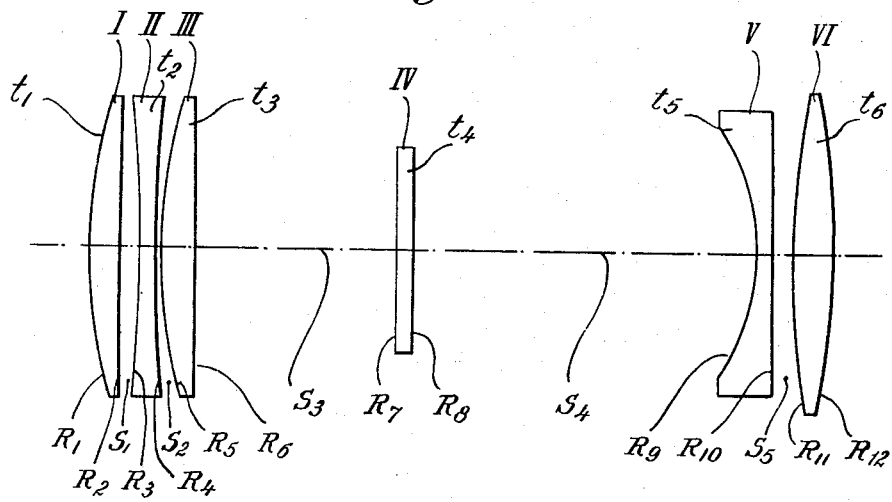

| $f = 1.000$ | | | | | |
|---|---|---|---|---|---|
| Lens | Radii | Thicknesses | $N_D$ | $v$ | Glass Types |
| I | $R_1 = 0.321$ | $t_1 = 0.022$ | 1.517 | 64.5 | BSC-2 |
|  | $R_2 = 2.642$ | $s_1 = 0.009$ |  |  |  |
| II | $R_3 = -1.045$ | $t_2 = 0.011$ | 1.720 | 29.3 | EDF-3 |
|  | $R_4 = 1.045$ | $s_2 = 0.002$ |  |  |  |
| III | $R_5 = 0.331$ | $t_3 = 0.023$ | 1.517 | 64.5 | BSC-2 |
|  | $R_6 = $ plano | $s_3 = 0.138$ * |  |  |  |
| IV | $R_7 = $ plano | $t_4 = 0.010$ | *** |  |  |
|  | $R_8 = $ plano | $s_4 = 0.223$ |  |  |  |
| V | $R_9 = -0.139$ | $t_5 = 0.010$ | 1.517 | 64.5 | BSC-2 |
|  | $R_{10} = $ plano | $s_5 = 0.014$ |  |  |  |
| VI | $R_{11} = 0.605$ | $t_6 = 0.025$ | 1.5725 | 42.5 | LF-1 |
|  | $R_{12} = -0.507$ | 0.331 ** |  |  |  |

\* The stop lies 0.118 from $R_6$ and has a clear aperture of 0.120 for f/6.3.

\*\* Back focus.

\*\*\* Filter glass; red, yellow, or clear.

INVENTOR.
James G. Baker
BY
Pennie Edmonds Morton Barrows
ATTORNEYS

Nov. 27, 1951 J. G. BAKER 2,576,436
TELEPHOTO TYPE OBJECTIVE LENS
Filed Oct. 8, 1949 2 SHEETS—SHEET 2

Fig. 2.

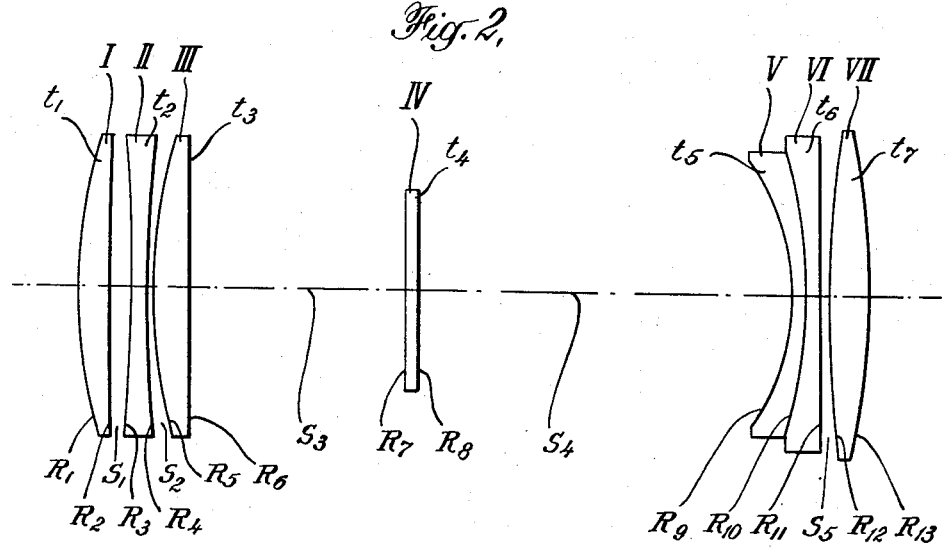

| $f = 1.000$ | | | | $f/6.3$ | |
|---|---|---|---|---|---|
| Lens | Radii | Thicknesses | $N_D$ | $v$ | Glass Types |
| I | $R_1 = 0.329$ | $t_1 = 0.023$ | 1.517 | 64.5 | BSC-2 |
|  | $R_2 = 2.625$ | $s_1 = 0.009$ |  |  |  |
| II | $R_3 = -1.121$ | $t_2 = 0.011$ | 1.720 | 29.3 | EDF-3 |
|  | $R_4 = 1.221$ | $s_2 = 0.002$ |  |  |  |
| III | $R_5 = 0.366$ | $t_3 = 0.023$ | 1.517 | 64.5 | BSC-2 |
|  | $R_6 = $ plano | $s_3 = 0.141$ * |  |  |  |
| IV | $R_7 = $ plano | $t_4 = 0.008$ | *** |  |  |
|  | $R_8 = $ plano | $s_4 = 0.247$ |  |  |  |
| V | $R_9 = -0.151$ | $t_5 = 0.008$ | 1.720 | 29.3 | EDF-3 |
|  | $R_{10} = -0.306$ |  |  |  |  |
| VI | $R_{11} = $ plano | $t_6 = 0.008$ | 1.517 | 64.5 | BSC-2 |
|  |  | $s_5 = 0.007$ |  |  |  |
| VII | $R_{12} = 0.825$ | $t_7 = 0.027$ | 1.720 | 29.3 | EDF-3 |
|  | $R_{13} = -0.450$ | 0.314 ** |  |  |  |

\* The stop lies at 0.118 from $R_6$ and has a clear aperture of 0.120 for $f/6.3$.
\*\* Back focus.
\*\*\* Filter glass; red, yellow, or clear.

INVENTOR.
James G. Baker
BY
Pennie Edmonds Morton Barrows
ATTORNEYS

SEARCH ROOM

Patented Nov. 27, 1951

2,576,436

UNITED STATES PATENT OFFICE 2,576,436

TELEPHOTO TYPE OBJECTIVE LENS

James G. Baker, Orinda, Calif., assignor to The Perkin-Elmer Corporation, Glenbrook, Conn., a corporation of New York Application October 8, 1949, Serial No. 120,321

10 Claims. (Cl. 88—57)

This invention relates to optical objectives for visual and photographic purposes and is concerned more particularly with a novel objective of the telephoto type, that is, one in which the rear principal plane is located in front of the front surface of the objective.

Telephoto objectives are ordinarily of an asymmetrical construction and this leads to pronounced image aberrations. Correction of the primary aberrations of such lenses is wholly insufficient and an objective may have small or zero primary aberrations and still be quite useless because of uncorrected secondary aberrations. The primary and secondary monochromatic aberrations of telephoto systems together with the longitudinal and lateral chromatic aberrations are so bound together that a change in one affects all the others. Because of their asymmetry, such systems are normally afflicted with pincushion distortion of considerable magnitude, coma, lateral color, and chromatic distortion, and efforts to reduce these errors often lead to exaggerated zonal spherical aberration and higher order astigmatism.

The telephoto ratio of a lens system is the ratio of the axial length of the system between the forward vertex of the front (long conjugate side) lens of the system and the focal plane to the equivalent focal length of the system and, whereas partially or fully symmetrical systems have values for the ratio exceeding unity, the ratio for a telephoto system is less than 1.00. Telephoto objectives may be formed in many ways, but generally have a predominant net positive lens action in the front of the system and a predominant net negative lens action in the rear of the system. The telephoto ratio is approximately a quadratic function of the separation of the positive and negative components with the ratio passing through a minimum value as the separation increases. The numerical magnitude of the minimum value will depend on the lens powers and on the value of the Petzval sum, which governs in a general way the flatness of the final image plane, according to well known optical theory. In practice, it is often unnecessary to design a telephoto lens having a minimum telephoto ratio and it is usually more important to attain high performance with a reasonable ratio. The lenses of the invention have telephoto ratios between about 0.77 and about 0.85, but it is to be understood that mere adoption of such a range for the ratio does not insure good performance.

The telephoto lens of the invention is characterized by an improved state of correction for all the aberrations mentioned and by image quality of a high level over the angular field. In the new lens, these results are obtained in a novel way. The lens is intended for relatively restricted fields and for great focal lengths and the various aberrations are weighted according to their importance in such an application. The improved performance of the new lens is obtained without the use of difficult forms of construction and the lens curves are on the whole weaker than normal in such lenses. The higher order aberrations are kept within reasonable bounds by reducing the magnitude of such aberrations from the start, rather than by attempting to compensate inherently large aberrations from some surfaces by equally large aberration of opposite sign from one or more other surfaces. In the new lens, it has proved possible to obtain zero secondary astigmatism at a chosen field angle by control of certain lens surfaces, as will presently be described.

For a better understanding of the invention, reference may be made to the accompanying drawings, in which Fig. 1 shows one form of the new lens, in which the rear component is made of a pair of air spaced elements; and Fig. 2 shows an alternative form of the lens, in which the rear component consists of a doublet and a single element spaced therefrom.

The table of data for the lens of Fig. 1 is as follows:

*Example I*

F=1.000    f/6.3

| Lens | Radii | Thicknesses | $n_D$ | V | Glass Types |
|---|---|---|---|---|---|
| I | $R_1$ = 0.321<br>$R_2$ = 2.642 | $t_1$=0.022<br>$s_1$=0.009 | 1.517 | 64.5 | BSC-2 |
| II | $R_3$ =−1.045<br>$R_4$ = 1.045 | $t_2$=0.011<br>$s_2$=0.002 | 1.720 | 29.3 | EDF-3 |
| III | $R_5$ = 0.331<br>$R_6$ = plano | $t_3$=0.023<br>[1] $s_3$=0.138 | 1.517 | 64.5 | BSC-2 |
| IV | $R_7$ = plano<br>$R_8$ = plano | $t_4$=0.010<br>$s_4$=0.223 | (2) | | |
| V | $R_9$ =−0.139<br>$R_{10}$= plano | $t_5$=0.010<br>$s_5$=0.014 | 1.517 | 64.5 | BSC-2 |
| VI | $R_{11}$= 0.605<br>$R_{12}$=−0.507 | $t_6$=0.025<br>[3] 0.331 | 1.5725 | 42.5 | LF-1 |

[1] The stop lies at 0.118 from $R_6$ and has a clear aperture of 0.120 for f/6.3.
[2] Filter glass; red, yellow, or clear.
[3] Back focus.

The table of data for the lens of Fig. 2 is as follows:

Example II

F=1,000    f/6.3

| Lens | Radii | Thicknesses | $n_D$ | V | Glass Types |
|---|---|---|---|---|---|
| I | $R_1 = 0.329$<br>$R_2 = 2.625$ | $t_1=0.023$<br>$s_1=0.009$ | 1.517 | 64.5 | BSC-2 |
| II | $R_3 = -1.121$<br>$R_4 = 1.221$ | $t_2=0.011$<br>$s_2=0.002$ | 1.720 | 29.3 | EDF-3 |
| III | $R_5 = 0.366$<br>$R_6 =$ plano | $t_3=0.023$<br>$^1 s_3=0.141$ | 1.517 | 64.5 | BSC-2 |
| IV | $R_7 =$ plano<br>$R_8 =$ plano | $t_4=0.008$<br>$s_4=0.247$ | (²) | | |
| V | $R_9 = -0.151$<br>$R_{10} = -0.306$ | $t_5=0.008$ | 1.720 | 29.3 | EDF-3 |
| VI | $R_{11}=$ plano<br>$R_{12}= 0.825$ | $t_6=0.008$<br>$s_6=0.007$ | 1.517<br>1.720 | 64.5<br>29.3 | BSC-2<br>EDF-3 |
| VII | $R_{13}=-0.450$ | $t_7=0.027$<br>$^3 0.314$ | | | |

¹ The stop lies at an axial distance of 0.120 from $R_6$ and has a clear aperture of 0.121 for f/6.3.
² Filter glass; red, yellow, or clear.
³ Back focus.

The following table contains data for a third lens embodying the invention:

Example III

F=1,000    f/6.3

| Lens | Radii | Thicknesses | $n_D$ | V | Glass Types |
|---|---|---|---|---|---|
| I | $R_1 = 0.327$<br>$R_2 = 2.812$ | $t_1=0.023$<br>$s_1=0.009$ | 1.517 | 64.5 | BSC-2 |
| II | $R_3 = -1.092$<br>$R_4 = 1.092$ | $t_2=0.011$<br>$s_2=0.002$ | 1.720 | 29.3 | EDF-3 |
| III | $R_5 = 0.344$<br>$R_6 =$ plano | $t_3=0.023$<br>$^1 s_3=0.139$ | 1.517 | 64.5 | BSC-2 |
| IV | $R_7 =$ plano<br>$R_8 =$ plano | $t_4=0.010$<br>$s_4=0.230$ | (²) | | |
| V | $R_9 = -0.141$<br>$R_{10}=-0.415$ | $t_5=0.010$ | 1.517 | 64.5 | BSC-2 |
| VI | $R_{11}=$ plano | $t_6=0.010$<br>$s_5=0.005$ | 1.720 | 29.3 | EDF-3 |
| VII | $R_{12}= 0.807$<br>$R_{13}=-0.412$ | $t_7=0.026$<br>$^3 0.331$ | 1.689 | 30.9 | EDF-2 |

¹ The stop lies at 0.118 from $R_6$ and has a clear aperture of 0.120 for f/6.3.
² Filter glass; red, yellow, or clear.
³ Back focus.

The lenses of the three examples given consist in each case of a positive component in the forward part of the system and a negative component in the rear. Each component may be made up of positive and negative elements and the components are separated by an axial distance exceeding 0.3F, where F is the focal length of the system. The large space between the components may contain the color filters required for photographic use, in which event, the thickness of the filter glass and its index of refraction must be taken into account in developing the final design data but cannot be employed for design purposes.

The positive or front member of a telephoto system will have certain residual aberrations of its own, such as spherical aberration, coma, astigmatism, and the like, and, if overall correction is to be achieved, one or more of these aberrations must be of considerable magnitude and compensation therefor obtained in the negative rear member. While the rear component is thus providing compensating negative aberrations, its negative action is at the same time magnifying the aberrations of the front component, such magnifying action being more pronounced for spherical aberration than for coma, and more for coma than for astigmatism, etc. It is thus of the utmost importance that the aberrations of the front component be kept within desirable limits, since, otherwise, it is necessary to compensate large aberrations by other large aberrations with resulting zonal terms giving unacceptable performance. In developing a telephoto lens, the object in view should, therefore, be to reduce the aberrations of the front component as much as possible and the individual aberrations should be so controlled that the compensations are mild in character and, where possible, compensated in turn by higher order tendencies of opposite sign. The lenses of all three examples are characterized by possessing under-corrected third order or primary astigmatism, slightly over-corrected fifth order or secondary astigmatism, and moderately varying under-corrected seventh and higher order residuals blanded over the spectrum and aperture.

In order to achieve reduced aberration for the front objective of a telephoto lens, the lens forms must be chosen with especial care and heretofore, considerable use has been made of the cemented doublet construction. While rather complex forms of objective construction might be adopted to minimize such aberrations as lateral color, longitudinal secondary color, distortion, oblique spherical, and others, I have found that a front component of three air spaced elements answers the purpose effectively and simply. The preferred form of such a component, as established by extensive calculations, consists of a front positive element of a medium to low index of refraction of 1.47 to 1.62, a middle negative element of a medium to high index of 1.60 to 1.75, and a rear positive element of a medium to low index of 1.47 to 1.62. Splitting the positive action between two positive elements makes possible a marked reduction in the under-corrected spherical aberration, and placing the negative element of higher index in the middle permits a contribution to the correction of distortion and astigmatism without causing excessive over-correction of the lower rim rays.

The use in the front component of the new lens of positive elements of low indices within the limits stated surrounding a negative element of high index within the limits stated produces an enhanced Petzval positive curvature. The splitting of the positive action between two elements is so effective in reducing aberrations that the glass used for these two elements may be of low index and this tends toward obtaining a low telephoto ratio. For systems faster than those of the examples, it is necessary to increase the index of the positive elements from the value of 1.517 of the examples to a higher level of 1.62 in the limit, at a partial sacrifice of correction of distortion. Any higher value for the index would require such a strong negative element for color compensation that the oblique spherical aberration and oblique coma would be adversely affected.

The negative element of the front component of the new lens has a high index of refraction for reduction of distortion and favorable correction of the lower rim rays. For faster systems than those of the examples, the index of the negative element must be reduced below the value of 1.720 given in the three examples at a partial sacrifice of distortion correction. The limits for this index lie between 1.60 and 1.75 and the use of a glass of higher index detrimentally affects control of lateral color and chromatic distortion, while the use of a glass of lower index results in the necessity of employing excessive curvatures with accompanying adverse effect on the lower rim rays.

It has been determined that the front air-surface of the central negative element of the front component should have a radius lying between $-0.8F$ and $-1.3F$. A shorter radius than $-0.8F$ for the surface introduces too much spherical aberration of negative sign as well as other aberrations. The use of a radius greater than $-1.3F$ for the surface results in too great a burden being placed on the front surface of the front element of the rear component, as will presently be described, so that the radius of that front surface falls outside limits found to be desirable.

The arrangement of glass types in the front component, as described, with the resultant enhanced Petzval sum requires added negative power in the rear component for the purpose of obtaining an average flat field. The telephoto ratio is thereby usefully decreased within the safety zone permitted by moderate lens speed. Further useful results can be obtained by assigning a portion of the task of correcting the spherical aberration of the system to the negative central element of the first component. The amount of the correction assigned to the element must be kept within limits, since, if the element is given too great a burden, excessive secondary coma or oblique spherical aberration results, and, if the burden is too small, the rear component of the system will have too much negative work to do and both higher order coma and zonal spherical aberration will result.

When the negative element of the front component accomplishes the right amount of negative spherical correction, the rear negative component of the system can be placed near the focal plane. The net result is a gain in the effective positive power of the system as a whole or, considered otherwise, weaker lens powers in terms of the power of the system. Also the higher order aberrations are thereby reduced. While positioning the negative rear component nearer the focal plane increases the telephoto ratio, the choice of glass types for the front component keeps the ratio at reasonable levels. The telephoto ratio for the examples given is about 0.82 and an increase in the central air space beyond about $0.4F$, which corresponds to a telephoto ratio of about 0.85, would result in increaing the ratio at an accelerating rate outside the limit of 0.85 adopted for the range of systems of interest.

Other valid reasons for limiting the length of the main air space are as follows. If the air space is too large, the rear component must be of considerable diameter merely to provide adequate illumination for even reasonable off-axis angles. The telephoto lenses of the invention are intended for relatively small coverage and great focal length, so that there is an optimum size for the rear component to accommodate the field. Pencils of rays refracted in the outer portion of the rear component suffer strong refractions by the steep lens slopes in this region. In general, the lens curves of the rear component approximate those of the front component, because the positive and negative powers are approximately in balance, and, consequently, if the aberrations are to remain under control, the diameter of the rear component may not be much greater than that of the front component. In the examples given, the last element of the entire system has a diameter only about 10% greater than that of the first element.

Many known types of telephoto systems have pronounced over-corrected secondary astigmatism, and the primary astigmatism is under-corrected in partial compensation. The residual astigmatism is quite noticeable in resolution tests and, for a mean focal position, causes an inevitable deterioration of the mean image quality. I have discovered a remedy for such customary negative astigmatism, which can be best understood by considering the lens having the data in Table I. Although this lens is apparently closely similar to those of the examples, the lens of Table I is afflicted with considerable over-corrected or negative secondary astigmatism, whereas the lenses of the examples are fully corrected.

TABLE I

*System with marked higher-order negative astigmatism*

$F = 1.000 \qquad f/6.3$

| Lens | Radii | Thicknesses | $n_D$ | V | Glass Types |
|---|---|---|---|---|---|
| I | $R_1 = 0.328$ | $t_1 = 0.023$ | 1.517 | 64.5 | BSC-2 |
|    | $R_2 = 2.620$ | $s_1 = 0.009$ |       |      |       |
| II | $R_3 = -1.119$ | $t_2 = 0.011$ | 1.72 | 29.3 | EDF-3 |
|    | $R_4 = 1.218$ | $s_2 = 0.002$ |      |      |       |
| III | $R_5 = 0.365$ | $t_3 = 0.023$ | 1.517 | 64.5 | BSC-2 |
|     | $R_6 = $ plano | $s_3 = 0.141$ |       |      |       |
| IV | $R_7 = $ plano | $t_4 = 0.008$ | Color Filter | | |
|    | $R_8 = $ plano | $s_4 = 0.243$ |   |   |   |
| V | $R_9 = -0.154$ | $t_5 = 0.008$ | 1.72 | 29.3 | EDF-3 |
|   | $R_{10} = -0.289$ |   |   |   |   |
| VI | $R_{11} = -5.353$ | $t_6 = 0.008$ | 1.517 | 64.5 | BSC-2 |
| VII | $R_{12} = 1.025$ | $s_5 = 0.009$ | 1.72 | 29.3 | EDF-3 |
|     | $R_{13} = -0.456$ | $t_7 = 0.024$ |   |   |   |

0.320 (Back focus).

The differences in construction between the lens of Example III and that of Table I appear to be slight, but, in view of the differences between the lenses in performance, it is apparent that the design is sensitive to small changes and, hence, the limits, within the improvement can be made, are narrowly drawn.

The differences between the data of Table I and Example III relating to the front component may be neglected. In the rear component, the fourth air space, $s_4$, is 0.243 in Table I and 0.247 in Example III. The ninth radius in the table is $-0.154$ and, in the example, is $-0.151$. While these differences are small, they are nevertheless important, since they make possible more pronounced changes in the eleventh and twelfth radii, $R_{11}$ and $R_{12}$, which can be considered to be the real control on correction of secondary astigmatism. Thus, by changing $R_{11}$ of the table from $-5.353$ to infinity, as in the example, which is a small change in actual lens shape, and by changing $R_{12}$ of the table from 1.025 to 0.825, as in the example, the secondary astigmatism is corrected, the primary astigmatism of both systems being zero.

While the indicated changes required to correct the lens of Table I for secondary astigmatism are quite small, other factors lead to a widening of the limits required to effect the correction. Thus, if the index of refraction of the last positive element of the system is reduced, the radius $R_{12}$ of the front surface of the element shortens. Correspondingly, if the mean index of the negative element, single or compound, is changed, the required value for the radius $R_{11}$ of the rear air surface of that element must also be changed. It has been determined from a number of cases that, in order that the desired correction of the secondary astigmatism may be accomplished without being overdone, the index of refraction of the rear positive element should have a mean value of between 1.55 and 1.75, such mean value being the numerical average of the indices of the constituents of the element, if it is compounded. The radius of the front air surface of the rear positive element, $R_{12}$ in Table I and Example III, should then lie between the limits $0.5F$ and $2.0F$ and be convex toward the front. It is not necessary to assign corresponding limits to the radius of the rear air surface of the negative element of the negative component, $R_{11}$ in the table and the example, since one depends upon the other and the limits given to the radius $R_{12}$ define the requisite range and nature of the invention.

Telephotos of the kind under discussion are remarkably sensitive to the radius of the concave negative surface of the rear component adjacent the filter and intermediate stop of the system, such radius being designated $R_9$ in the table and example. For the three examples given, this radius has a total range from $-0.139$ to $-0.151$, but, by varying the nature of the front component with respect to the amount of correction for spherical aberration, or by varying the telephoto ratio, or both, the range for the radius $R_9$ can be raised or lowered without departing too far from acceptable results. When the lens speed must be increased, which may in turn effect a change in the distribution of the indices in the front component, as above described, the range for the radius $R_9$ must be increased. The lower limit cannot be reduced much without introducing unmanageable aberrations, nor can the upper limit be raised much without making it impossible to correct the system spherically. It has been determined that this radius should lie within the range $-0.125F$ to $-0.165F$. Correspondingly, as above explained, the radius of the front air surface of the negative central element of the front positive component should not exceed $-1.3F$, since otherwise, the burden imposed on the surface with radius $R_9$ will necessitate that radius fall below the lower limit $-0.125F$.

I find that it is advantageous in the new lens to employ an air space between the elements of the second component of a length, which is greater than $0.003F$ and may be as large as $0.015F$. It will be noted that, in the lenses of the examples, the air space referred to lies within the limits mentioned.

Because of the asymmetry of telephoto construction, telephoto lenses corrected for distortion necessarily have large zonal terms in the distortion residuals. Thus, zero distortion can be obtained only at an assigned field angle, but, at intermediate and more distant field angles, appreciable distortion will be observed. While a combination in the rear lens group resulting in zeros in both the distortion and the higher order astigmatism at the same field angle might be found, such a state of correction is not mandatory. Telephoto lenses are rarely used for mapping purposes and it is only desired that the distortion be kept within reasonable bounds. As a consequence, it is more important that emphasis be placed on control of the astigmatism. The lenses of the three examples are all about equally well corrected for secondary and primary astigmatism. The lens of Example I has a zero distortion about 6 degrees off-axis and hence tends to being overcorrected for distortion. The lens of Example II is about the same, but that of Example III has zero distortion about 10 degrees off-axis. Conventional telephoto lenses have pincushion distortion of much greater magnitude numerically and, for such lenses, there is no zero for distortion anywhere, except as reduced to the optical axis.

The spherical aberration of the lenses of all three examples is so well corrected that the residual zonal aberation at $f/6.3$ is well within the Rayleigh limit over a comfortable spectral range.

The construction of the rear component of the lens of the invention can be varied considerably without changing the state of correction for secondary astigmatism, as described above. It is in this respect that the lenses of the three examples can be differentiated from one another.

In the lens of Example I, the rear component consists of but two single elements, of which the front element is strongly negative and of low index and the rear element is strongly positive and of high index. The oblique spherical aberration, though small by the usual standards, is such as to restrict illumination at 12 degrees off-axis to about 50% of the axial illumination, if an image free of flare beyond the tolerance of the doubled Rayleigh limit is to be achieved for systems of focal lengths up to 72 inches.

The state of correction of the oblique spherical aberration can be improved by compounding the negative element of the rear component into two elements of high and low index of refraction, and the lens of Example II includes such a compounded negative element, with the glass of high index in front. The illumination at 12 degrees off-axis can now be increased to about 70%, because of the improvement in the oblique spherical aberration brought about by the use of glasses of high indices of refraction. The compounding of the negative element of the rear component can be reversed and this arrangement is employed in the lens of Example III, which is equivalent to that of Example II, except for the slight difference in the position of zero dictortion described above. The lenses of both Examples II and III gain from the increase in the index of refraction of the rear positive element of the rear component over the index of that element in the lens of Example I.

While the rear positive element can be compounded, it has been observed that this has strong effects on the higher order of astigmatism, so that over-correction becomes difficult to control. In such a compounded rear positive element, glasses with indices of refraction differing only slightly might be employed and appropriate radii adopted to effect a correction for even the seventh order astigmatism. The gain is practice would be immaterial and would be concealed by other aberrations more difficult to reduce.

The term "mean index" employed in the following claims is to be understood as the numerical average of the indices of refraction within a component.

I claim:

1. A telephoto objective having a telephoto ratio between about 0.77 and 0.85, which comprises a front (long conjugate side) positive component and a rear (short conjugate side) negative component separated by an air space of a length between $0.3F$ and $0.4F$, F being the focal length of the system, the positive component consisting of three air-spaced elements, of which the outer two elements are positive and have indices of refraction lying between 1.47 and 1.62 and the middle element is negative and has an index of refraction higher than the indices of said outer two elements and lying between 1.60 and 1.75 and a front air surface of a radius of curvature between $-0.8F$ and $-1.3F$, the rear component consisting of a negative front element spaced from a positive rear element.

2. A telephoto objective as defined in claim 1, in which the front air surface of the front element of the rear component has a radius of curvature between −0.125F and −0.165F.

3. A telephoto objective as defined in claim 1, in which the rear element of the rear component has a front air surface of a radius of curvature between 0.5F and 2.0F.

4. A telephoto objective as defined in claim 1, in which the front negative element of the rear component has a mean index of refraction between 1.47 and 1.65 and a front air surface of a radius of curvature between −0.125F and −0.165F and the rear positive element of the rear component has a mean index of refraction between 1.55 and 1.75 and a front air surface of a radius of curvature between 0.5F and 2.0F.

5. A telephoto objective as defined in claim 1, in which the rear negative component consists of a single negative element of an index of refraction lying between 1.47 and 1.57 and a single positive element of an index of refraction between 1.55 and 1.65.

6. A telephoto objective as defined in claim 1, in which the rear negative component consists of a negative doublet and a positive simple element, the doublet being made up of a high index negative element cemented to a low index negative element, the mean index of refraction of the doublet lying between 1.57 and 1.65 and the positive element having an index of refraction lying between 1.65 and 1.75.

7. A telephoto objective as defined in claim 1, in which the air space between the elements of the negative component has a length lying between 0.003F and 0.015F.

8. A telephoto objective having numerical data substantially as follows:

F=1.000    f/6.3

| Lens | Radii | Thicknesses | $n_D$ | V | Glass Types |
|---|---|---|---|---|---|
| I | $R_1 = 0.321$ | $t_1 = 0.022$ | 1.517 | 64.5 | BSC-2 |
|  | $R_2 = 2.642$ | $s_1 = 0.009$ |  |  |  |
| II | $R_3 = -1.045$ | $t_2 = 0.011$ | 1.720 | 29.3 | EDF-3 |
|  | $R_4 = 1.045$ | $s_2 = 0.002$ |  |  |  |
| III | $R_5 = 0.331$ | $t_3 = 0.023$ | 1.517 | 64.5 | BSC-2 |
|  | $R_6 = $ plano | [1] $s_3 = 0.138$ |  |  |  |
| IV | $R_7 = $ plano | $t_4 = 0.010$ | (²) |  |  |
|  | $R_8 = $ plano | $s_4 = 0.223$ |  |  |  |
| V | $R_9 = -0.139$ | $t_5 = 0.010$ | 1.517 | 64.5 | BSC-2 |
|  | $R_{10} = $ plano | $s_5 = 0.014$ |  |  |  |
| VI | $R_{11} = 0.605$ | $t_6 = 0.025$ | 1.5725 | 42.5 | LF-1 |
|  | $R_{12} = -0.507$ | [3] 0.331 |  |  |  |

[1] The stop lies at 0.118 from $R_6$ and has a clear aperture of 0.120 for f/6.3.
[2] Filter glass; red, yellow, or clear.
[3] Back focus.

in which $R_1$, $R_2$ ... represent radii of surfaces beginning from the left, $t_1$, $t_2$ ... represent the axial thicknesses of the individual elements, and $s_1$, $s_2$ ... represent the axial air separations between the components.

9. A telephoto objective having numerical data substantially as follows:

F=1.000    f/6.3

| Lens | Radii | Thicknesses | $n_D$ | V | Glass Types |
|---|---|---|---|---|---|
| I | $R_1 = 0.329$ | $t_1 = 0.023$ | 1.517 | 64.5 | BSC-2 |
|  | $R_2 = 2.625$ | $s_1 = 0.009$ |  |  |  |
| II | $R_3 = -1.121$ | $t_2 = 0.011$ | 1.720 | 29.3 | EDF-3 |
|  | $R_4 = 1.221$ | $s_2 = 0.002$ |  |  |  |
| III | $R_5 = 0.366$ | $t_3 = 0.023$ | 1.517 | 64.5 | BSC-2 |
|  | $R_6 = $ plano | [1] $s_3 = 0.141$ |  |  |  |
| IV | $R_7 = $ plano | $t_4 = 0.008$ | (²) |  |  |
|  | $R_8 = $ plano | $s_4 = 0.247$ |  |  |  |
| V | $R_9 = -0.151$ | $t_5 = 0.008$ | 1.720 | 29.3 | EDF-3 |
|  | $R_{10} = -0.306$ |  |  |  |  |
| VI | $R_{11} = $ plano | $t_6 = 0.008$ | 1.517 | 64.5 | BSC-2 |
| VII | $R_{12} = 0.825$ | $s_5 = 0.007$ | 1.720 | 29.3 | EDF-3 |
|  | $R_{13} = -0.450$ | $t_7 = 0.027$ |  |  |  |
|  |  | [3] 0.314 |  |  |  |

[1] The stop lies at an axial distance of 0.120 from $R_6$ and has a clear aperture of 0.121 for f/6.3.
[2] Filter glass; red, yellow, or clear.
[3] Back focus.

in which $R_1$, $R_2$ ... represent radii of surfaces beginning from the left, $t_1$, $t_2$ ... represent the axial thicknesses of the individual elements, and $s_1$, $s_2$ ... represent the axial air separations between the components.

10. A telephoto objective having numerical data substantially as follows:

F=1.000    f/6.3

| Lens | Radii | Thicknesses | $n_D$ | V | Glass Types |
|---|---|---|---|---|---|
| I | $R_1 = 0.327$ | $t_1 = 0.023$ | 1.517 | 64.5 | BSC-2 |
|  | $R_2 = 2.812$ | $s_1 = 0.009$ |  |  |  |
| II | $R_3 = -1.092$ | $t_2 = 0.011$ | 1.720 | 29.3 | EDF-3 |
|  | $R_4 = 1.092$ | $s_2 = 0.002$ |  |  |  |
| III | $R_5 = 0.344$ | $t_3 = 0.023$ | 1.517 | 64.5 | BSC-2 |
|  | $R_6 = $ plano | [1] $s_3 = 0.139$ |  |  |  |
| IV | $R_7 = $ plano | $t_4 = 0.010$ | (²) |  |  |
|  | $R_8 = $ plano | $s_4 = 0.230$ |  |  |  |
| V | $R_9 = -0.141$ | $t_5 = 0.010$ | 1.517 | 64.5 | BSC-2 |
|  | $R_{10} = -0.415$ |  |  |  |  |
| VI | $R_{11} = $ plano | $t_6 = 0.010$ | 1.720 | 29.3 | EDF-3 |
|  |  | $s_5 = 0.005$ |  |  |  |
| VII | $R_{12} = 0.807$ | $t_7 = 0.026$ | 1.689 | 30.9 | EDF-2 |
|  | $R_{13} = -0.412$ | [3] 0.331 |  |  |  |

[1] The stop lies at 0.118 from $R_6$ and has a clear aperture of 0.120 for f/6.3.
[2] Filter glass; red, yellow, or clear.
[3] Back focus.

in which $R_1$, $R_2$ ... represent radii of surfaces beginning from the left, $t_1$, $t_2$ ... represent the axial thicknesses of the individual elements, and $s_1$, $s_2$ ... represent the axial air separations between the components.

JAMES G. BAKER.

REFERENCES CITED

The following references are of record in the file of this patent:

UNITED STATES PATENTS

| Number | Name | Date |
|---|---|---|
| 1,791,276 | Konig | Feb. 3, 1931 |
| 2,380,207 | Aklin | July 10, 1945 |

FOREIGN PATENTS

| Number | Country | Date |
|---|---|---|
| 4,523 | Great Britain | of 1906 |
| 316,246 | Germany | Nov. 24, 1919 |
| 222,709 | Great Britain | Oct. 9, 1924 |
| 388,215 | Great Britain | Feb. 23, 1933 |